United States Patent [19]

Kadono et al.

[11] Patent Number: 4,946,620
[45] Date of Patent: Aug. 7, 1990

[54] ACID GAS ABSORBENT COMPOSITION

[75] Inventors: Yukio Kadono, Yokohama; Yoshiaki Urano; Fumio Watanabe, both of Kawasaki, all of Japan

[73] Assignees: Nippon Shokubai Kagaku Kogyo Co., Ltd., Osaka, Japan; Norton Company, Worcester, Mass.

[21] Appl. No.: 273,578

[22] Filed: Nov. 21, 1988

[30] Foreign Application Priority Data

Nov. 6, 1987 [JP] Japan .................. 62-279050

[51] Int. Cl.$^5$ ............................. B01D 53/02
[52] U.S. Cl. ....................... 252/190; 55/73; 55/68
[58] Field of Search ............. 252/190; 55/73, 68; 423/226

[56] References Cited

U.S. PATENT DOCUMENTS

| | | |
|---|---|---|
| 2,139,375 | 12/1938 | Millar et al. . |
| 2,926,751 | 7/1960 | Kohl et al. . |
| 3,594,985 | 7/1971 | Ameen et al. . |
| 3,607,004 | 9/1971 | Deschamps ............... 423/226 X |
| 3,649,190 | 4/1972 | Deschamps et al. .......... 423/226 |
| 3,737,392 | 6/1973 | Ameen et al. . |
| 3,877,893 | 4/1975 | Sweny et al. . |
| 4,044,100 | 8/1977 | McElroy . |
| 4,302,220 | 11/1981 | Volkamer et al. ........... 55/73 X |
| 4,330,305 | 5/1982 | Kuessner et al. . |
| 4,483,834 | 11/1984 | Wood ........................ 55/73 X |
| 4,498,911 | 2/1985 | Deal et al. ................. 55/73 X |
| 4,536,382 | 8/1985 | Blytas et al. .............. 423/243 X |
| 4,581,154 | 4/1986 | Kutsher et al. . |
| 4,741,745 | 12/1988 | Kadono et al. . |
| 4,795,620 | 1/1989 | Heisel et al. ............... 55/73 X |

FOREIGN PATENT DOCUMENTS

| | | |
|---|---|---|
| 0062789 | 10/1982 | European Pat. Off. . |
| 0082579 | 6/1983 | European Pat. Off. . |
| 0248541 | 12/1987 | European Pat. Off. . |
| 84095952/16 | 4/1984 | Fed. Rep. of Germany . |
| 84095951/16 | 4/1984 | Fed. Rep. of Germany . |
| 49-98383 | of 1974 | Japan . |
| 23446B12 | 9/1978 | Japan . |
| 59-45034 | of 1984 | Japan . |
| 1429396 | 3/1976 | United Kingdom . |

Primary Examiner—John S. Maples
Assistant Examiner—Valerie D. Fee
Attorney, Agent, or Firm—Burns, Doane, Swecker & Mathis

[57] ABSTRACT

The present invention discloses an acid gas absorbent composition, comprising a diethylene glycol dialkyl ether represented by the general formula I:

$$R^1O(C_2H_4O)_2R^2 \qquad (I)$$

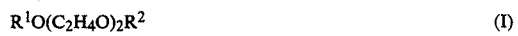

wherein $R^1$ and $R^2$ are independently an alkyl group of 1 to 4 carbon atoms, and a polyethylene glycol dialkyl ether represented by the general formula II:

$$R^3O(C_2H_4O)_nR^4 \qquad (II)$$

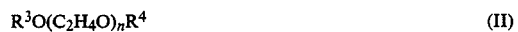

wherein $R^3$ and $R^4$ are independently an alkyl group of 1 to 4 carbon atoms and n is an integer in the range of 3 to 8.

6 Claims, No Drawings

ACID GAS ABSORBENT COMPOSITION

BACKGROUND OF THE INVENTION

1. Field of the Invention

This invention relates to a novel acid gas absorbent composition. More particularly, it relates to an excellent acid gas absorbent composition for separating by absorption such acid gases as carbon dioxide and hydrogen sulfide from a mixed gas. The acid gas absorbent composition of this invention is particularly useful for the separation of acid gases which are contained in natural gas, synthetic gas, and coke oven gas.

2. Description of the Prior Art:

The practice of using organic solvents or aqueous solutions of such organic solvents as acid gas absorbents for the removal of such acid gases as carbon dioxide and hydrogen sulfide from natural gas and mixed gas has been widely known in the art. Various acid gas absorbents are mentioned in the third edition (1979) of "Gas Purification" written by A. L. Kohl and F. C. Riesenfeld, for example.

Generally, the gas absorbents are divided by the mechanism of absorption into chemical absorbents (causing absorption by chemical reaction) and physical absorbents (causing absorption by physical union). As chemical absorbents, aqueous solutions of such alkanolamines as ethanolamine and hot potassium carbonate solution are chiefly used.

In all the physical absorbents available for the removal of such acid gases as carbon dioxide and hydrogen sulfide from such mixed gases as natural gas and synthetic gas, ethers of polyethylene glycol oligomers are used most widely.

In Japanese Patent Publication SHO No. 48(1973)-23,782, U.S. Pat. No. 3,737,392, and U.S. Pat. No. 4,581,154, for example, the use of dimethyl ether of ethylene glycol oligomer (dimer to octamer) as an absorbent for the removal of acid gases from mixed gases is disclosed.

Japanese Patent Publication SHO No. 59(1984)-45,034 discloses the use of methyl isopropyl ether of polyethylene glycol of the general formula:

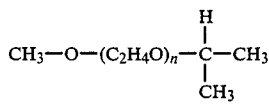

wherein n is an integer in the range of 2 to 8, as an absorbent for the removal of acid gases such as carbon dioxide and/or hydrogen sulfide from a mixed gas.

Japanese Patent Laid-Open SHO 49(1974)-98,383 discloses the use of an alkylpolyethylene glycol tertiary butyl ether of the general formula:

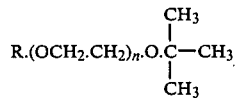

wherein R is a linear or branched alkyl group of one to four carbon atoms and n is an integer in the range of 2 to 10, preferably 2 to 5, as an absorbent for the removal of acid gases such as carbon dioxide and/or hydrogen sulfide from natural gas.

U.S. Pat. No. 2,139,375 discloses the use of an ether or ester or an ether-ester mixture of a polyhydric alcohol or polyhydric alcohol oligomer as an absorbent for the removal of sulfur-containing acid gases from a mixed gas. In this U.S. Patent, as examples of the absorbent applicable thereto, dipropyl ethers of diethylene glycol and dipropylene glycol are mentioned among various other substances. In the specification of this U.S. Patent, there is a mention to the effect that the ability of the absorbent to absorb the acid gases increases with the decreasing size of the alkyl group linked to the oxygen atom and methyl ether exhibits the highest ability to absorb the acid gases. It has no mention whatever about superiority of dipropyl ether.

U.S. Pat. No. 3,877,893 discloses the use of a polyethylene glycol dialkyl ether possessing one to eight carbon atoms and three to eight ethylene units as an absorbent for the removal of impurities containing carbon dioxide from a mixed gas. In the specification, polyethylene glycol dimethyl ether is designated as the best of all the specific absorbents disclosed. This U.S. Patent has absolutely no mention about speriority of diisopropyl ether.

U.S. Pat. No. 4,044,100 discloses the use of a mixture of diisopropanol amine and a polyethylene glycol dialkyl ether. Not exclusively in the specification of this U.S. Patent, there is a mention to the effect that dimethyl ether excels other ethers.

U.S. Pat. No. 4,741,745 also discloses the use of polyethylene glycol diisopropyl ether as absorbent for the removal of the acid gases.

U.S. Pat. No. 2,926,751 discloses the use of propylene carbonate as an acid gas absorbent for the removal of such acid gases as carbon dioxide from a mixed gas.

The chemical absorbents using aqueous solutions of alkanol amines have limits to the capacity for absorbing acid gases such as carbon dioxide and/or hydrogen sulfide and, therefore, prove to be disadvantageous for the treatment of a mixed gas having a high partial pressure of carbon dioxide. The aqueous solution of alkanol amine which has absorbed carbon dioxide gas is caused in a regeneration column to release the carbon dioxide gas and then returned for reuse to the carbon dioxide gas absorption column. For this regeneration, the aqueous solution must be heated. When the amount of the carbon dioxide gas absorbed in the aqueous solution is large, therefore, the heat required for the regeneration is fairly large. The susceptibility of the apparatus to corrosion by the absorbent also poses a problem.

The physical absorbent is such that the capacity thereof for absorption of carbon dioxide gas is proportional to the partial pressure of carbon dioxde gas in the mixed gas under the treatment. In the separation by absorption of carbon dioxide gas from a mixed gas having a high partial pressure of carbon dioxde gas, the ability of the physical absorbent to absorb the carbon dioxde gas is large as compared with that of the chemical absorbent. Further in the step of regeneration, the physical absorbent is easily enabled to release the absorbed carbon dioxide gas by relief of pressure of dispersion with air or other inert gas. Thus, the physical absorbent is also advantageous in terms of energy consumption over the chemical absorbent.

Such physical absorbents as dimethyl ether of polyethylene glycol and propylene carbonate heretofore disclosed to the art, however, may not well be regarded as possessing any fully satisfactory capacity for the absorption of carbon dioxide gas. When a physical absorbent possessing a still larger capacity for the absorption of carbon dioxide gas is developed, it will make a conspicuous contribution to economy as be permitting compaction of apparatus and reduction of energy consumption.

As examples of the known acid gas absorbent for the removal of acid gases such as carbon dioxide and hydrogen sulfide form mixed gases, dimethyl ether of polyethylene glycol, methyl isopropyl ether of polyethylene glycol, and alkyl polyethylene glycol-tertiary butyl ethers may be mentioned. These known acid gas absorbents, however, have no fully sufficient capacity for the absorption of acid gases.

In all the polyethylene glycol diisopropyl ethers contemplated by the invention of the our earlier development, diethylene glycol diisopropyl ether excels in ability to absorb acid gases. Since this particular compound possesses relatively high vapor pressure, the operation of absorption by the use of this compound must be carried out at a low temperature enough to avoid loss of the absorbent during the course of the operation.

An object of this invention, therefore, is to provide a novel acid gas absorbent composition.

Another object of this invention is to provide a novel physical absorbent which possesses a large capacity for the absorption of acid gases as compared with the conventional physical absorbents and possesses a sufficiently low vapor pressure, and serves advantageously for the absorption of acid gases.

SUMMARY OF THE INVENTION

The objects are accomplished by a acid gas absorbent composition, comprising a diethylene glycol dialkyl ether represented by the general formula I:

$$R^1O(C_2H_4O)_2R^2 \qquad (I)$$

wherein $R^1$ and $R^2$ are independently an alkyl group of 1 to 4 carbon atoms, and a polyethylene glycol dialkyl ether represented by the general formula II:

$$R^3O(C_2H_4)_nR^4 \qquad (II)$$

wherein $R^3$ and $R^4$ are independently an alkyl group of 1 to 4 carbon atoms and n is an integer in the range of 3 to 8.

To be specific, we have found as the result of a diligent study that the addition of a polyethylene glycol dialkyl ether to a diethylene glycol dialkyl ether brings about an effect of notably lowering the vapor pressure of the ether to an extent greater than the drop of vapor pressure calculated in accordance with the Raoult's law and gives rise to a composition capable of retaining a fully satisfactory ability to absorb acid gases. The present invention has been perfected based on this knowledge.

EXPLANATION OF PREFERRED EMBODIMENT

The acid gas absorbent composition offered by the present invention is a mixture of a diethylene glycol dialkyl ether represented by the general formula I:

$$R^1O(C_2H_4O)_2R^2 \qquad (I)$$

wherein $R^1$ and $R^2$ are independently an alkyl group of 1 to 4 carbon atoms, more desirably 1 to 3 carbon aoms, and most desirably 3 carbon atoms, and a polyethylene glycol dialkyl ether represented by the general formula II:

$$R^3O(C_2H_4O)_nR^4 \qquad (II)$$

wherein R3 and R4 are independently an alkyl group 1 to 4 carbon atoms, more desirably 1 to 3 carbon atoms, and most desirably 3 carbon atoms, and n is an integer in the range of 3 to 8, providing that when the general formula II represents a mixture, the average molecular weight of the mixture is in the range of 135 to 400, preferably 190 to 300.

As specific examples of the diethylene glycol dialkyl ether contemplated by the present invention, diethylene glycol dimethyl ether, diethylene glycol methylethyl ether, diethylene glycol methylisopropyl ether, diethylene glcyol methyl-ter.-butyl ether, diethylene glcyol diethyl ether, diethylene glycol ethylisopropyl ether, diethylene glycol ethyl-ter.-butyl ether, diethylene glycol diisopropyl ether, diethylene glycol isopropyl-ter.-butyl ether, diethylene glcyol di-ter.-butyl ether and mixtures thereof may be mentioned.

As specific examples of the polyethylene glycol dialkyl ether contemplated by the present invention, triethylene glycol dimethyl ether, triethylene glycol methylethyl ether, triethylene glycol methylisopropyl ether, triethylene glycol methyl-ter.-butyl ether, triethylene glycol diethyl ether, triethylene glycol ethylisopropyl ether, triethylene glycol ethyl-ter.-butyl ether, triethylene glycol diisopropyl ether, triethylene glycol isopropyl-ter.-butyl ether, triethylene glycol di-ter.-butyl ether, tetraethylene glcyol dimethyl ether, tetraethylene glycol methylethyl ether, tetraethylene glycol methylisopropyl ether, tetraethylene glycol methyl-ter.-butyl ether, tetraethylene glycol diethyl ether, tetraethylene glycol ethylisopropyl ether, tetraethylene glycol ethyl-ter.-butyl ether, tetraethylene glycol diisopropyl ether, tetraethylene glycol isopropyl-ter.-butyl ether, tetraethylene glycol di-ter.-butyl ether, and mixtures having added thereto three to eight mols of ethylene oxide, i.e. dimethyl ether, methylethyl ether, methylisopropyl ether, methyl-ter.-butyl ether, diethyl ether, ethylisopropyl ether, ethyl-ter.-butyl ether, diisopropyl ether, isopropyl-ter.-butyl ether, and di-ter.-butyl ether respectively of polyethylene glycol may be cited.

Typically a diethylene glycol dialkyl ether and a polyethylene glycol dialkyl ether of this invention are produced by a method which comprises causing a glycol such as diethylene glycol, triethylene glycol, or tetraethylene glycol to react with an alkyl halide, an alkali hydroxide, or an alkali metal at a temperature in the range of 50° to 150° C. or by a method which comprises causing an olefin such as propylene or isobutene to react with polyethylene glycol in the presence of an acid catalyst, for example. A diethylene glycol dialkyl ether and a polyethylene glycol dialkyl ether having mutually different terminal alkyl group are produced by a method which comprises causing alcohols to react wiht ethylene oxide at a temperature in the range of 50° to 200° C. under a pressure in the range of 5 to 50 kg/cm²G. thereby forming a diethylene glcyol monoalkyl ether and a polyethylene glycol monoalkyl ether and subsequently causing the monoalkyl ethers to react with an alkyl halide, an alkali hydroxide or an alkali metal at a temperature in the range of 50° to 150° C. or by a method which comprises causing an olefin such as propylene or isobutene to react with a diethylene glycol monoalkyl ether or a polyethylene glycol monoalkyl ether in the presence of an acid catalyst.

As examples of the glycol as the starting material for a diethylene glycol dialkyl ether and a polyethylene glycol dialkyl ether, diethylene glycol, triethylene glycol, tetraethylene glycol, and mixtures thereof may be cited.

As examples of the monoalkyl ethers, i.e. diethylene glycol and polyethylene glycol, as the starting materials for a diethylene glycol dialkyl ether and a polyethylene glycol dialkyl ether of the present invention, there may be mentioned monomethyl, monoethyl, monopropyl, and monobutyl ethers severally of diethylene glycol, triethylene glycol, and tetraethylene glycol.

Typical examples of the alkyl halide as an etherifying agent in the present invention include methyl chloride, ethyl chloride, propyl chloride, butyl chloride, methyl bromide, and ethyl bromide.

As examples of the olefin to be used for the etherification in the present invention, propylene and isobutene may be mentioned.

For the composition to be advantageously used as an absorbent for acid gases, high capacity for the absorption of carbon dioxide under high pressure, ample difference in the amount of absorption under low pressure and high pressure, sufficiently low viscosity particularly at low temperatures, stability to withstand hydrolysis, and prevention of the loss of absorbent due to low vapor pressure are important factors demanding due consideration. Examples of the absorbent composition which proves to be particularly desirable in terms of these factors are a composition comprising diethylene glycol diisopropyl ether and tetraethylene glycol diisopropyl ether and a composition comprising diethylene glycol diisopropyl ether and polyethylene glycol diisopropyl ether, i.e. a mixture having added thereto 3 to 8 mols of ethylene oxide, having an average molecular weight in the range of 135 to 400.

The absorbent composition of this invention constitutes itself an acid gas absorbent enjoying ample capacity for absorption, low vapor pressure, and wide range of working temperature as compared with the conventional absorbent particularly when the molar ratio of the diethylene glycol dialkyl ether to the polyethylene glycol dialkyl ether is in the range of 95 :5 to 60:40, preferably 85:15 to 65:35.

If the amount of a polyethylene glycol dialkyl ether to be incorporated in the composition exceeds 40 mol %, the composition possesses a still lower vapor pressure and yet suffers from a decline in the capacity for the absorption of acid gases. Thus, the composition is no longer advantageous over the conventional physical absorbent.

As an example of the process for which this invention can be particularly advantageously utilized, the removal of carbon dioxide from a synthetic gas may be cited. Typically, this process is effected by causing the synthetic gas to contact the absorbent in a carbon dioxide absorption column which is operated under a pressure of about 27 atmospheres. The carbon dioxide absorbed in the absorbent and hence separated from the mixed gas flows downwardly inside the absorption column. The absorbent which has absorbed the carbon dioxide gas is forwarded through the bottom of the absorption column into a flash drum which is operated under a pressure in the range of 5 to 10 atmospheres. In the flash drum, the greater part of hydrogen, methane, and inert gas are separated from the absorbent. The separated gases are continuously compressed and then recycled to the absorption column or used for other purposes. Since the carbon dioxide is retained substantially wholly in the absorbent at this stage, the absorbent is introduced into a second flash drum which is operated under a pressure of about 1 atmosphere. In the second flash drum, 50 to 70% of the carbon dioxide is separated from the absorbent and recovered and forwarded to a carbon dioxide product line. When the carbon dioxide is recovered from the absorbent in a sufficiently large amount, the absorbent is regenerated in a diffusion column. Generally, air which is used as a diffusion medium is brought into counterflow contact with the absorbent in a packed column. The air now entraining a small amount of carbon dioxide is released from the top of the column into the ambient air. The absorbent which has undergone diffusion contains substantially no carbon dioxide and is recycled to the absorption column. The carbon dioxide which is released into the ambient air as entrained by the air escapes recovery in the present process.

Where the amount of carbon dioxide to be used is large and the ratio of recovery of this gas is high as a necessary consequence, the absorbent which has been treated in the second flash drum operated under a pressure of 1 atmosphere is generally introduced into a vacuum flash drum operated under a pressure in the range of 0.3 to 0.8 atmosphere before it is advanced to the air diffusion column. When the third flushing operation is carried out under a sufficiently low pressure, the ratio of recovery of carbon dioxide increases to 90%.

The several improvements in the process of separation described above fall in the scope of general practices knwon to the art. Optionally, the absorption may be carried out by any of the following methods.

A method which comprises using an air diffusion column designed to effect the diffusion under a vacuum in place of the flush drum designed to introduce air into counterflow contact with the absorbent tehreby decreasing the amount of air required for the treatment and increasing the concentration of carbon dioxide in the released gas and a method which comprises effecting the diffusion with the synthetic gas having undergone the treatment of absorption in place of air are available, for example. In the case of the latter method mentioned above, the carbon dioxide is recovered practically wholly because the gas emanating from the diffusion column is recycled to the absorption column via the bottom thereof.

The acid gas absorbent composition of this invention which comprise a diethylene glycol dialkyl ether and a polyethylene glycol dialkyl ether possesses a high ability to absorb acid gases and produces a sufficiently low vapor pressure as compared with the conventional acid gas absorbent. The operation of absorption by the use of this acid gas absorbent composition, therefore, need not to be carried out at low temepratures. This fact permits a reduction in the cost of equipment and the cost of operation. As an acid gas absorbent for the separation by absorption of such acid gases as carbon dioxide gas and hydrogen sulfide gas from a mixed gas, this acid gas absorbent composition manifests an outstanding performance.

Now, the present invention will be described more specifically below with reference to working examples. It should be noted, however, that the present invention is not restricted by these examples.

Amount of absorption of carbon dioxide gas

In the examples, the amount of carbon dioxide gas absorbed was determined at a temperature of 25° C. under a pressure of 6 atmospheres of carbon dioxide gas and reported in terms of the number of mols of carbon dioxide per kg of the relevant absorbent.

EXAMPLE 1

In an autoclave of stainless steel possessing an inner volume of 300 ml and maintained at a fixed temperature (25° C.), 100 g of an acid gas absorbent composition comprising 80 mol % of diethylene glycol diisopropyl ether and 20 mol % of tetraethylene glycol diisopropyl ether was placed and deaerated under a vacuum. From a carbon dioxide gas cylinder provided with a pressure guage, carbon dioxide gas was introduced into the autoclave until a constant inner pressure was reached. The amount of the carbon dioxide gas absorbed was determined by comparing the amount of carbon dioxide as released from to the cylinder and the amount of carbon dioxide gas contained in the inner gaseous phase of the autoclave. The amount of the absorbed carbon dioxide gas is shown in Table 1.

EXAMPLE 2

In an autoclave of stainless steel possessing an inner volume of 300 ml and maintained at a fixed temperature (25° C.), 100 g of an acid gas absorbent composition comprising 80 mol % of diethylene glycol ethylisopropyl ether and 20 mol % of tetraethylene glycol ethylisopropyl ether was placed and deaerated under a vacuum. From a carbon dioxide gas cylinder provided with a pressure guage, carbon dioxide gas was introduced into the autoclave until constant inner pressure was reached. The amount of the carbon dioxide gas absorbed was determined by comparing the amount of carbon dioxide gas released from to the cylinder and the amount of carbon dioxide gas contained in the inner gaseous phase of the autoclave. The amount of the absorbed carbon dioxide gas is shown in Table 1.

EXAMPLE 3

In an autoclave of stainless steel possessing an inner volume of 300 ml and maintained at a fixed temperature (25° C.), 100 g of an acid gas absorbent composition comprising 80 mol % of diethylene glycol diisopropyl ether and 20 mol % of triethylene glycol diisopropyl ether was placed and deaerated under a vacuum. From a carbon dioxide gas cylinder provided with a pressure guage, carbon dioxide gas was introduced into the autoclave until a constant inner pressure was reached. The amount of the carbon dioxide gas absorbed was determined by comparing the amount of carbon dioxide as released from to the cylinder and the amount of carbon dioxide gas contained in the inner gaseous phase of the autoclave. The amount of the absorbed carbon dioxide gas is shown in Table 1.

EXAMPLE 4

In an autoclave of stainless steel possessing an inner volume of 300 ml and maintained at a fixed temperature (25° C.), 100 g of an acid gas absorbent composition comprising 70 mol % of diethylene glycol diisopropyl ether and 30 mol % of polyethylene glycol diisopropyl ether mixture having molecular weight of 280 (n=3 to 8) was placed and deaerated under a vacuum. From a carbon dioxide gas cylinder provided with a pressure guage, carbon dioxide gas was introduced into the autoclave until constant inner pressure was reached. The amount of the carbon dioxide gas absorbed was determined by comparing the amount of carbon dioxide gas released from to the cylinder and the amount of carbon dioxide gas contained in the inner gaseous phase of the autoclave. The amount of the absorbed carbon dioxide gas is shown in Table 1.

EXAMPLE 5

In an autoclave of stainless steel possessing an inner volume of 300 ml and maintained at a fixed temperature (25° C.), 100 g of an acid gas absorbent composition comprising 80 mol % of diethylene glycol diisopropyl ether and 20 mol % of tetraethylene glycol dimethyl ether was placed and deaerated under a vacuum. From a carbon dioxide gas cylinder provided with a pressure guage, carbon dioxide gas was introduced into the autoclave until a constant inner pressure was reached. The amount of the carbon dioxide gas absorbed was determined by comparing the amount of carbon dioxide as released from to the cylinder and the amount of carbon dioxide gas contained in the inner gaseous phase of the autoclave. The amount of the absorbed carbon dioxide gas is shown in Table 1.

EXAMPLE 6

In an autoclave of stainless steel possessing an inner volume of 300 ml and maintained at a fixed temperature (25° C.), 100 g of an acid gas absorbent composition comprising 80 mol % of diethylene glycol diisopropyl ether and 20 mol % of tetraethylene glycol ethylisopropyl ether was placed and deaerated under a vacuum. From a carbon dioxide gas cylinder provided with a pressure guage, carbon dioxide gas was introduced into the autoclave until constant inner pressure was reached. The amount of the carbon dioxide gas absorbed was determined by comparing the amount of carbon dioxide gas released from to the cylinder and the amount of carbon dioxide gas contained in the inner gaseous phase of the autoclave. The amount of the absorbed carbon dioxide gas is shown in Table 1.

Example 7

In an autoclave of stainless steel possessing an inner volume of 300 ml and maintained at a fixed temperature (25° C.), 100 g of an acid gas absorbent composition comprising 80 mol % of diethylene glycol dimethyl ether and 20 mol % of tetraethylene glycol diisopropyl ether was placed and deaerated under a vacuum. From a carbon dioxide gas cylinder provided with a pressure guage, carbon dioxide gas was introduced into the autoclave until a constant inner pressure was reached. The amount of the carbon dioxide gas absorbed was determined by comparing the amount of carbon dioxide as released from to the cylinder and the amount of carbon dioxide gas contained in the inner gaseous phase of the autoclave. The amount of the absorbed carbon dioxide gas is shown in Table 1.

EXAMPLE 8

In an autoclave of stainless steel possessing an inner volume of 300 ml and maintained at a fixed temperature (25° C.), 100 g of an acid gas absorbent composition comprising 80 mol % of diethylene glycol diethyl ether and 20 mol % of tetraethylene glycol diisopropyl ether was placed and deaerated under a vacuum. From a carbon dioxide gas cylinder provided with a pressure guage, carbon dioxide gas was introduced into the autoclave until constant inner pressure was reached. The amount of the carbon dioxide gas absorbed was determined by comparing the amount of carbon dioxide gas released from to the cylinder and the amount of carbon dioxide gas contained in the inner gaseous phase of the autoclave. The amount of the absorbed carbon dioxide gas is shown in Table 1.

CONTROL 1

In an autoclave of stainless steel possessing an inner volume of 300 ml and maintained at a fixed temperature (25° C.), 100 g of diethylene glycol diisopropyl was placed and deaerated under a vacuum. From a carbon dioxide gas cylinder provided with a pressure guage, carbon dioxide gas was introduced into the autoclave until a constant inner pressure was reached. The amount of the carbon dioxide gas absorbed was determined by comparing the amount of carbon dioxide as released from to the cylinder and the amount of carbon dioxide gas contained in the inner gaseous phase of the autoclave. The amount of the absorbed carbon dioxide gas is shown in Table 1.

CONTROL 2

In an autoclave of stainless steel possessing an inner volume of 300 ml and maintained at a fixed temperature (25° C.), 100 g of diethylene glycol ethylisopropyl ether was placed and deaerated under a vacuum. From a carbon dioxide gas cylinder provided with a pressure guage, carbon dioxide gas was introduced into the autoclave until constant inner pressure was reached. The amount of the carbon dioxide gas absorbed was determined by comparing the amount of carbon dioxide gas released from to the cylinder and the amount of carbon dioxide gas contained in the inner gaseous phase of the autoclave. The amount of the absorbed carbon dioxide gas is shown in Table 1.

CONTROL 3

In an autoclave of stainless steel possessing an inner volume of 300 ml and maintained at a fixed temperature (25° C.), 100 g of diethylene glycol dimethyl ether was placed and deaerated under a vacuum. From a carbon dioxide gas cylinder provided with a pressure guage, carbon dioxide gas was introduced into the autoclave until a constant inner pressure was reached. The amount of the carbon dioxide gas absorbed was determined by comparing the amount of carbon dioxide as released from to the cylinder and the amount of carbon dioxide gas contained in the inner gaseous phase of the autoclave. The amount of the absorbed carbon dioxide gas is shown in Table 1.

CONTROL 4

In an autoclave of stainless steel possessing an inner volume of 300 ml and maintained at a fixed temperature (25° C.), 100 g of diethylene glycol diethyl ether was placed and deaerated under a vacuum. From a carbon dioxide gas cylinder provided with a pressure guage, carbon dioxide gas was introduced into the autoclave until constant inner pressure was reached. The amount of the carbon dioxide gas absorbed was determined by comparing the amount of carbon dioxide gas released from to the cylinder and the amount of carbon dioxide gas contained in the inner gaseous phase of the autoclave. The amount of the absorbed carbon dioxide gas is shown in Table 1.

CONTROL 5

In an autoclave of stainless steel possessing an inner volume of 300 ml and maintained at a fixed temperature (25° C.), 100 g of polyethylene glycol dimethyl ether (average molecular weight 270, and n=3 to 10) was placed and deaerated under a vacuum. From a carbon dioxide gas cylinder provided with a pressure guage, carbon dioxide gas was introduced into the autoclave until a constant inner pressure was reached. The amount of the carbon diodide gas absorbed was determined by comparing the amount of carbon dioxide as released from to the cylinder and the amount of carbon dioxide gas contained in the inner gaseous phase of the autoclave. The amount of the absorbed carbon dioxide gas is shown in Table 1.

TABLE 1

|  | Acid gas absorbent composition | Ratio in mol % | Amount of absorbed carbon dioxide* | Vapor pressure of solvent (mmHg at 60° C.) |
| --- | --- | --- | --- | --- |
| Example 1 | Diethylene glycol diisopropyl ether | 80 | 1.08 | 0.55 |
|  | Tetraethylene glycol diisopropyl ether | 20 | | |
| Example 2 | Diethylene glycol ethylisopropyl ether | 80 | 1.10 | 0.80 |
|  | Tetraethylene glycol ethylisopropyl ether | 20 | | |
| Example 3 | Diethylene glycol diisopropyl ether | 80 | 1.10 | 0.84 |
|  | Tetraethylene glycol diisopropyl ether | 20 | | |
| Example 4 | Diethylene glycol diisopropyl ether | 70 | 1.06 | 0.50 |
|  | Polyethylene glycol diisopropyl ether (Average molecular weight 280) | 30 | | |
| Example 5 | Diethylene glycol diisopropyl ether | 80 | 1.09 | 0.84 |
|  | Tetraethylene glycol dimethyl ether | 20 | | |
| Example 6 | Diethylene glycol diisopropyl ether | 80 | 1.08 | 0.70 |
|  | Tetraethylene glycol ethylisopropyl ether | 20 | | |
| Example 7 | Diethylene glycol dimethyl ether | 80 | 1.28 | 9.0 |
|  | Tetraethylene glycol diisopropyl ether | 20 | | |
| Example 8 | Diethylene glycol diethyl ether | 80 | 1.15 | 2.9 |
|  | Tetraethylene glycol diisopropyl ether | 20 | | |
| Control 1 | Diethylene glycol diisopropyl ether | | 1.11 | 1.20 |
| Control 2 | Diethylene glycol ethylisopropyl ether | | 1.14 | 1.5 |
| Control 3 | Diethylene glycol dimethyl ether | | 1.46 | 14 |
| Control 4 | Diethylene glycol diethyl ether | | 1.17 | 4.5 |
| Control 5 | Polyethylene glycol dimethyl ether (Average molecular weight 270) | | 0.88 | 0.06 |

*Determined in terms of the number of moles of carbon dioxide/kg of solvent, at 25° C. under 6 atmospheres of partial pressure of carbon dioxide.

An acid gas absorbent composition, comprising a diethylene glycol dialkyl ether represented by the general formula I:

$$R^1O(C_2H_4O)_2R^2 \qquad (I)$$

wherien $R^1$ and $R^2$ are independently an alkyl group of 1 to 4 carbon atoms, and a polyethylene glycol dialkyl ether represented by the general formula II:

$$R^3O(C_2H_4O)_nR^4 \qquad (II)$$

wherein $R^3$ and $R^4$ are independently an alkyl group of 1 to 4 carbon atoms and n is an integer in the range of 3 to 8, possesses a large capacity for the absorption of acid gases and exhibits a sufficiently low vapor pressure. Thus, it serves advantageously as an acid gas absorbent for the separation by absorption of such acid gases as carbon dioxide gas and hydrogen sulfide gas from a mixed gas without any appreciable loss of the absorbent due to the impacts of the treatment of absorption.

What is claimed is:

1. An acid gas absorbent composition, comprising a diethylene glycol dialkyl ether represented by the general formula I:

$$R^1O(C_2H_4O)_2R^2 \qquad (I)$$

wherein $R^1$ and $R^2$ are independently an alkyl group of 1 to 4 carbon atoms, and a polyethylene glycol dialkyl ether represented by the general formula II:

$$R^3O(C_2H_4O)_nR^4 \qquad (II)$$

wherein $R^3$ and $R^4$ are independently an alkyl group of 1 to 4 carbon atoms and n is an integer in the range of 3 to 8, the molar ratio of said diethylene glycol dialkyl ether to said polyethylene glycol dialkyl ether being in the range of 95:5 to 60:40, and said gas absorbent composition having a lower vapor pressure than that calculated in accordance with Raoult's law.

2. A composition according to claim 1, wherein $R^1$ and $R^2$ in said general formula I are independently an alkyl group of 1 to 3 carbon atoms and $R^3$ and $R^4$ in said general formula II are independently an alkyl group of 1 to 3 carbon atoms.

3. A composition according to claim 2, wherein said diethylene glycol dialkyl ether is diethylene glycol diisopropyl ether and said polyethylene glycol dialkyl ether is tetraethylene glycol diisopropyl ether.

4. A composition according to claim 2, wherein said diethylene glycol dialkyl ether is diethylene glycol diisopropyl ether and said polyethylene glycol dialkyl ether is a polyethylene glycol diisopropyl ether having 3 to 8 mols of ethylene oxide added thereto and possesing an average molecular weight in the range of 234 to 400.

5. A composition according to claim 2, wherein the molar ratio of said diethylene glycol dialkyl ether to said polyethyelen glycol dialkyl ether is in the range of 85:15 to 65:35.

6. A composition according to claim 1, wherein a mixed gas contained said acid gas is at least one member selected from the group consisting of natural gas, synthetic gas, and coke oven gas.

* * * * *